United States Patent
Sap (10) Patent No.: US 8,960,795 B2
(45) Date of Patent: Feb. 24, 2015

(54) FOLDAWAY PASSENGER SEAT FOR UTILITY VEHICLE

(75) Inventor: Bruno Sap, Beauvais (FR)

(73) Assignee: AGCO SA, Beauvais (FR)

( * ) Notice: Subject to any disclaimer, the term of this patent is extended or adjusted under 35 U.S.C. 154(b) by 148 days.

(21) Appl. No.: 13/203,346

(22) PCT Filed: Feb. 11, 2010

(86) PCT No.: PCT/IB2010/000265
§ 371 (c)(1),
(2), (4) Date: Nov. 7, 2011

(87) PCT Pub. No.: WO2010/097669
PCT Pub. Date: Sep. 2, 2010

(65) Prior Publication Data
US 2012/0043795 A1 Feb. 23, 2012

(30) Foreign Application Priority Data
Feb. 25, 2009 (GB) .................... 0903115.4

(51) Int. Cl.
*B60N 2/30* (2006.01)
*B60N 2/38* (2006.01)
*B60N 2/02* (2006.01)

(52) U.S. Cl.
CPC .............. *B60N 2/305* (2013.01); *B60N 2/3043* (2013.01); *B60N 2/3045* (2013.01); *B60N 2/3052* (2013.01); *B60N 2/38* (2013.01); *B60N 2002/0208* (2013.01)
USPC .......................................... 297/331; 297/334

(58) Field of Classification Search
USPC ................................. 297/331, 334
See application file for complete search history.

(56) References Cited

U.S. PATENT DOCUMENTS

| | | | | |
|---|---|---|---|---|
| 427,570 | A * | 5/1890 | Harwood | 297/334 X |
| 1,395,757 | A * | 11/1921 | McWhirter | 297/334 |
| 2,153,155 | A * | 4/1939 | Page et al. | 297/331 X |
| 2,565,695 | A * | 8/1951 | Lynn | 297/334 X |
| 3,116,091 | A * | 12/1963 | Bethoon et al. | 297/334 X |
| 3,131,964 | A * | 5/1964 | Reed | 297/331 X |
| 3,376,587 | A * | 4/1968 | Staron | 297/331 X |
| 3,463,542 | A * | 8/1969 | Daniels | 297/331 X |

(Continued)

FOREIGN PATENT DOCUMENTS

| | | |
|---|---|---|
| DE | 2617942 A1 | 10/1977 |
| DE | 3617292 C1 | 7/1987 |
| EP | 0430905 A | 6/1991 |

OTHER PUBLICATIONS

PCT International Search Report for International Application No. PCT/IB2010/000265 published as WO2010/097669 A1 on Sep. 2, 2010.

(Continued)

*Primary Examiner* — Rodney B White (57) ABSTRACT

A foldaway passenger seat (20) for a utility vehicle (10) is provided. The seat (20) comprises a seat tray (22) which pivots around a single axis (X) between a substantially horizontal seating position and a substantially vertical stowed position. The axis is oriented so that a forward facing edge (22c) of the seat tray in the seating position becomes the lower-most edge in the stowed position and is longitudinally aligned with respect to the forward direction of travel. Advantageously, the seat tray pivots from the seating position to the stowed position in a single fluid movement.

16 Claims, 10 Drawing Sheets

(56) References Cited

U.S. PATENT DOCUMENTS

| | | | |
|---|---|---|---|
| 4,632,457 A | | 12/1986 | Hofrichter |
| 4,884,842 A | * | 12/1989 | Finkelstein .................. 297/331 |
| 5,364,151 A | * | 11/1994 | Yurasits .................... 297/331 X |
| 5,374,106 A | * | 12/1994 | Hoefer ......................... 297/236 |
| 5,516,180 A | * | 5/1996 | Eavenson et al. ......... 297/331 X |
| 5,524,722 A | * | 6/1996 | Bowman et al. .......... 297/331 X |
| 5,797,649 A | | 8/1998 | Snell, Jr. et al. |
| 6,550,854 B1 | * | 4/2003 | Downes ......................... 297/14 |
| 6,572,193 B2 | * | 6/2003 | Downes ........................ 297/335 |
| 6,890,032 B2 | * | 5/2005 | Fewchuk ................... 297/331 X |
| 7,469,966 B1 | * | 12/2008 | Vallee ....................... 297/331 X |
| 7,914,078 B2 | * | 3/2011 | Hentges .................... 297/331 X |
| 2002/0125754 A1 | | 9/2002 | Downes |
| 2005/0017558 A1 | * | 1/2005 | Fewchuk ....................... 297/331 |
| 2006/0131941 A1 | * | 6/2006 | Hendron et al. .............. 297/331 |

OTHER PUBLICATIONS

Search Report for Great Britain Application No. GB0903115.4 dated May 18, 2009.

* cited by examiner

FOLDAWAY PASSENGER SEAT FOR UTILITY VEHICLE

The invention relates to a foldaway passenger seat which has a seating position and a stowed position and is suitable for fitting to the inside of a utility vehicle cab.

Utility vehicles such as tractors typically comprise a single driver's seat which is often positioned centrally in the transverse direction of a cab structure. The position and structure of any passenger seat must be chosen carefully to optimise the available space within the driver's surroundings which is often as a premium. Foldaway passenger seats are known in the art but there is a continuing desire to minimise the space that they occupy when stowed and ease with which they can be moved between a seating position and a stowed position.

Thus, it is an object of the invention to provide an improved foldaway passenger seat for a utility vehicle which is simple to move between a seating and a stowed position.

According to the invention there is provided a foldaway passenger seat for a utility vehicle, the seat comprising a seat tray which can pivot around a single axis between a substantially horizontal seating position and a substantially vertical stowed position, wherein a forward facing edge of the seat tray in the seating position is the lower-most edge and aligned longitudinally when in the stowed position. By appropriate orientation of the single axis the seat tray can be moved from a seating position to a stowed position (and vice versa) in one simple movement. Advantageously this alleviates the complication of existing passenger seats which often require a complex stowing and unfolding operation making them cumbersome.

Furthermore, a seat in accordance with the invention is well-suited to implementation in a utility vehicle cab. The pivoting movement around a single axis allows the seat tray to project forwardly (in the direction of travel) from the mounting point in the seating position whilst projecting downwardly to the rear of the mounting point in the stowed position. Therefore, when in the seating position, a passenger is kept clear of the structure to which the seat is mounted. When in the stowed position, the seat tray can occupy the space between the driver's seat and the inside edge of the fender.

Further still, and advantageously, the single movement can be made in minimal space as the movement around the axis may follow the profile of the fender. Therefore, the spacing between the driver's seat and the fender edge need not be equal to the maximum dimension of the seat tray.

The axis is preferably within the range of 40 to 50 degrees to the horizontal and to a transverse vertical plane. By creating an angle which is approximately diagonal to both the horizontal and transverse vertical plane, the seat tray can be stowed substantially at right angles to the seating position in two axes.

In a preferred arrangement the seat is for mounting to the inside edge of a fender and the axis extends from one end nearest the fender rearwardly and upwardly.

The axis is preferably defined by a mounting shaft fixed relative to a cab of the utility vehicle. The seat tray is preferably secured to a mounting element at one end, the mounting element being rotatably mounted to the mounting shaft.

The mounting element preferably comprises a sleeve which fits and rotates on the mounting shaft.

In a preferred arrangement the mounting element further comprises at least one strut secured between the sleeve and the underside of the seat tray, the strut extending substantially radially from the sleeve. Preferably further still the mounting element comprises two struts secured to the seat base in a triangulated structure thereby providing a strong unyielding support for the seat tray.

The mounting shaft is preferably secured to a frame member which forms part of a cab structure.

The seat may further comprise a supporting element which is pivotally attached to the seat tray and engages with a catch when in the seating position to support part of a users weight when seated.

A specific embodiment of the invention will now be described with reference to the appended drawings in which.

To facilitate an understanding of the principles and features of the invention an illustrative embodiment is explained below. The terms 'forward', 'rearward' and 'transverse' as used herein are all referenced to the longitudinal centre line of the chassis of the tractor described moving in a forward direction.

Figure 1:
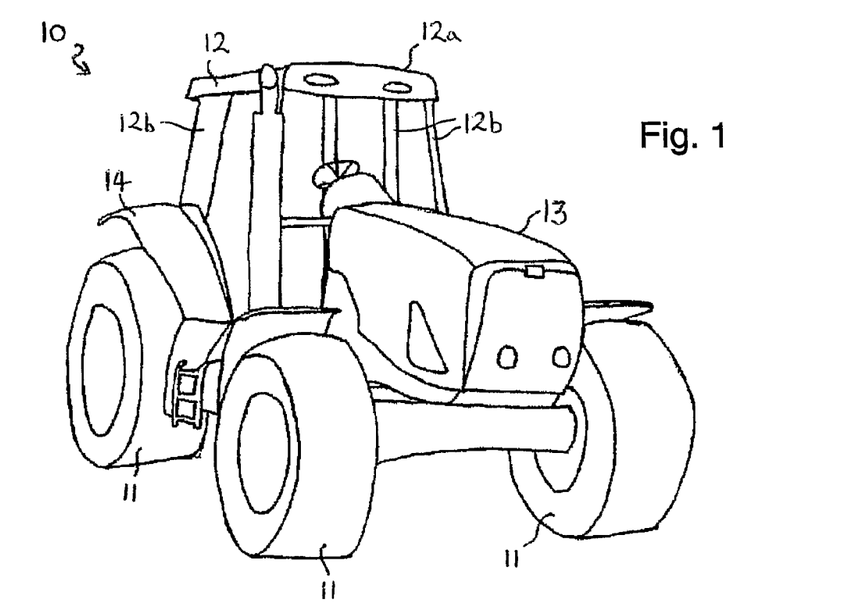
FIG. 1 is perspective view of a tractor.
Figure 2:
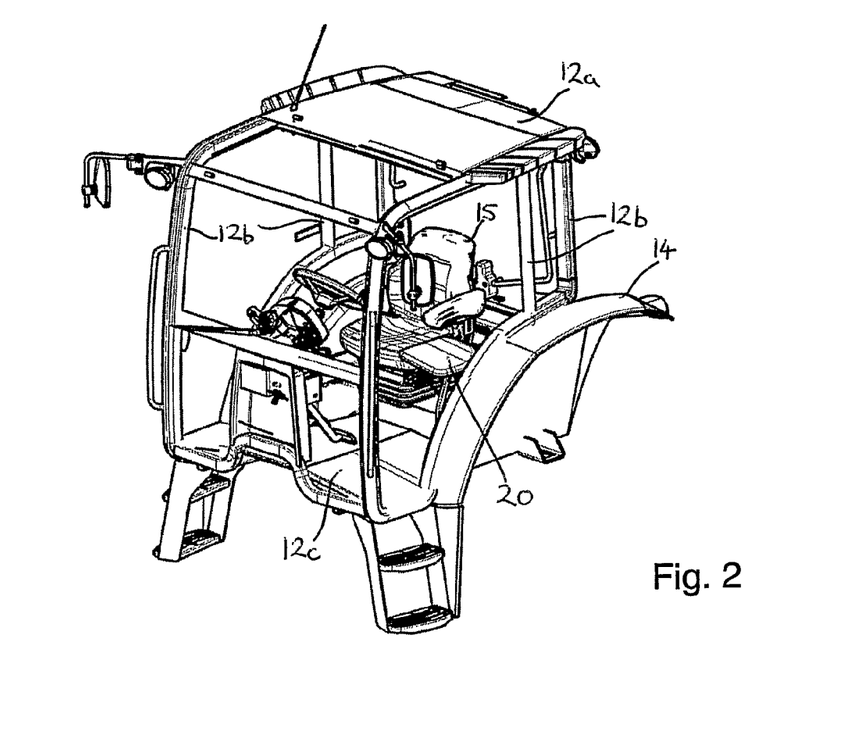
FIG. 2 is an isometric perspective view of a tractor cab having a passenger seat in accordance with the invention and shown with the passenger seat in a seating position.
Figure 3:
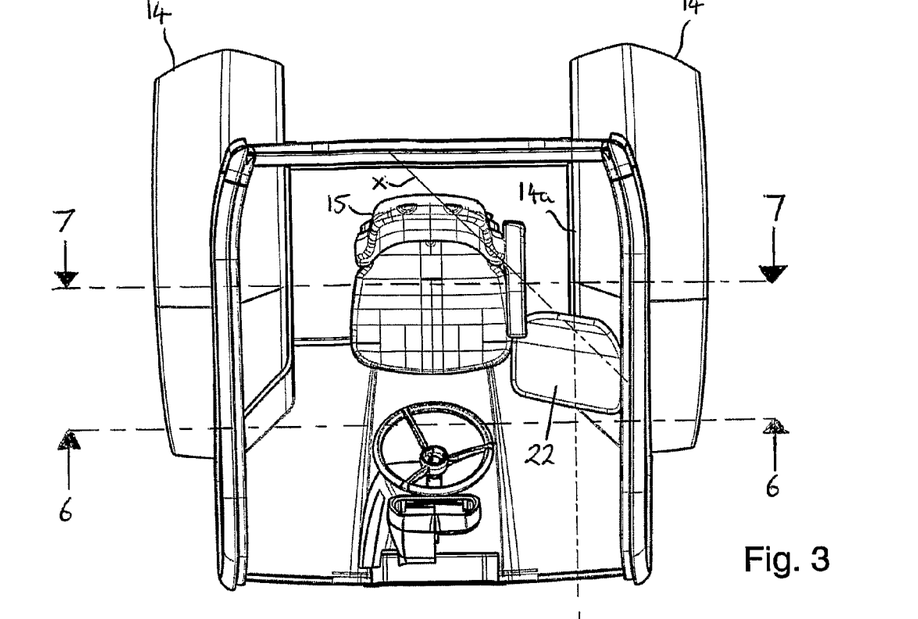
FIG. 3 is a plan view of the cab of FIG. 2.
Figure 4:
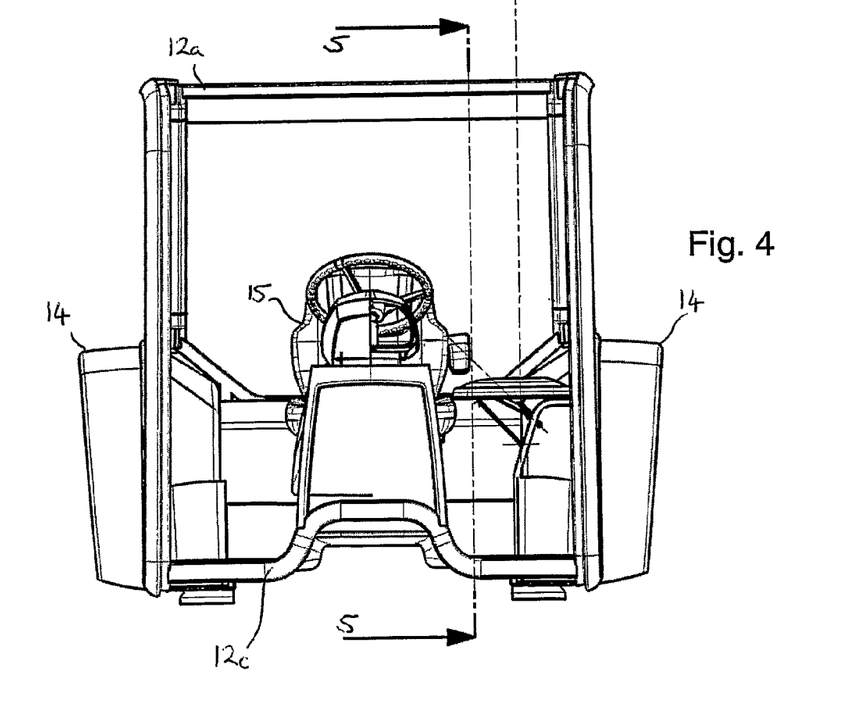
FIG. 4 is a front view of the cab of FIG. 2.

With reference to the drawings, a tractor 10 comprises wheels 11, a cab 12 and a hood 13 which encloses an engine compartment (not shown). The cab 12 comprises a roof 12a, upright support pillars 12b and a floor section 12c. It should be appreciated that the construction of the cab 12 shown in FIG. 1 differs to that shown in the other drawings.

The rear wheels 11 are partly covered by fenders 14 which extend inside the cab 12. A driver's seat 15 is positioned centrally between the fenders 14 and is secured to a raised section 16 of the cab floor 12c. The inside edge 14a of fenders 14 provide an interior wall of the cab 12 and, on one side, provides the most suitable location for a passenger seat.

Figure 8:
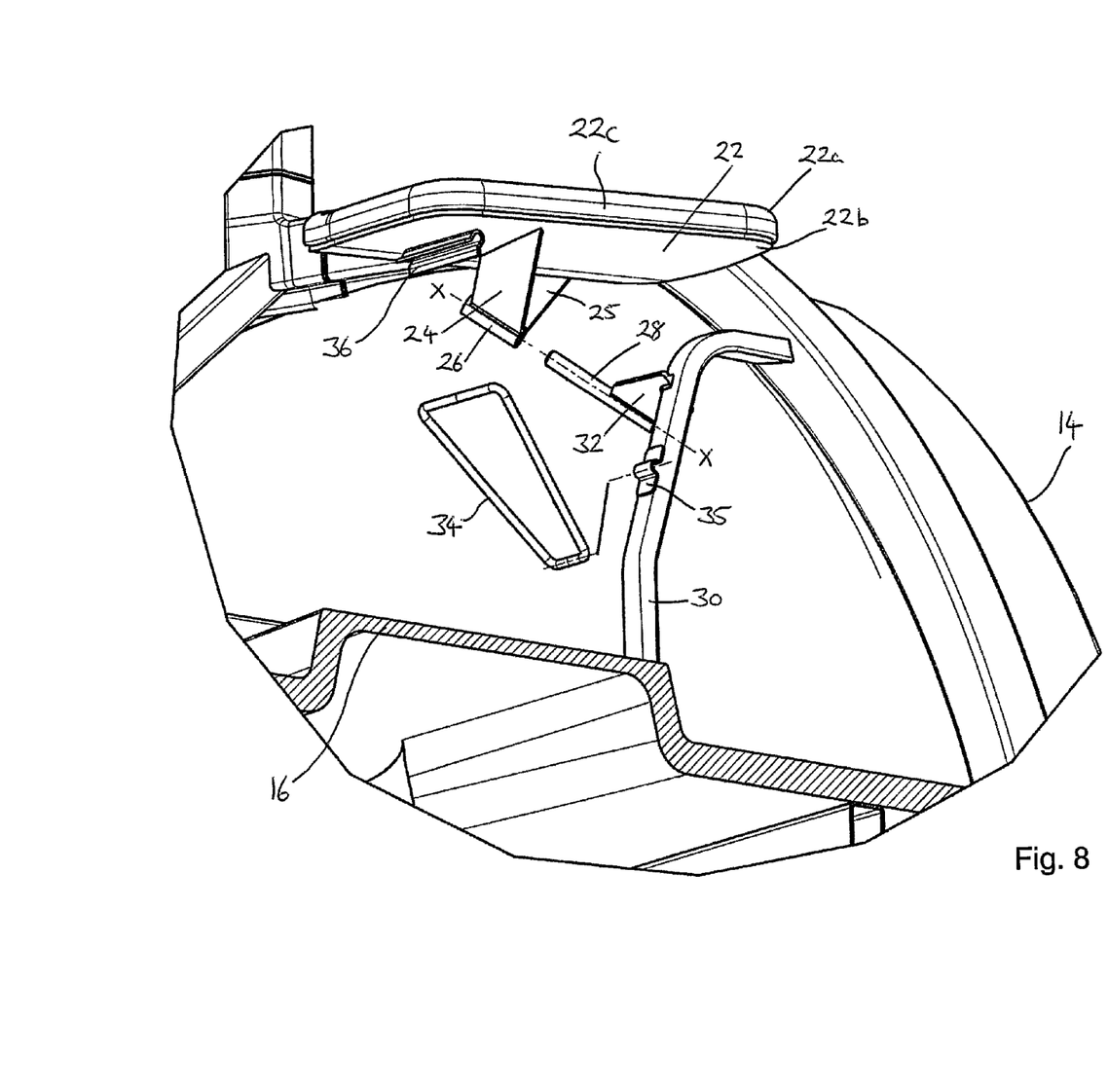
FIG. 8 is a perspective view of the section 6-6 shown in FIG. 3 shown with the driver's seat and steering wheel removed and showing the components of the passenger seat in exploded form.
Figure 9:
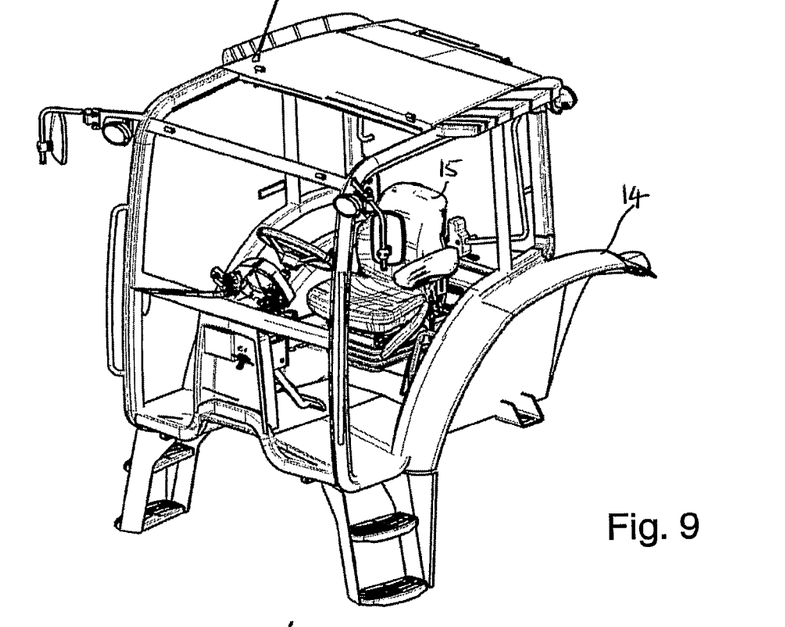
FIG. 9 is an isometric perspective view of the tractor cab of FIG. 2 shown with the passenger seat in an intermediate position.

A foldaway passenger seat 20 in accordance with the invention comprises a seat tray 22 formed of a moulded plastic section 22a supported on a rigid steel plate section 22b (FIG. 8). The upper surface of seat tray 22 provides a surface upon which a passenger can sit.

Figure 6:
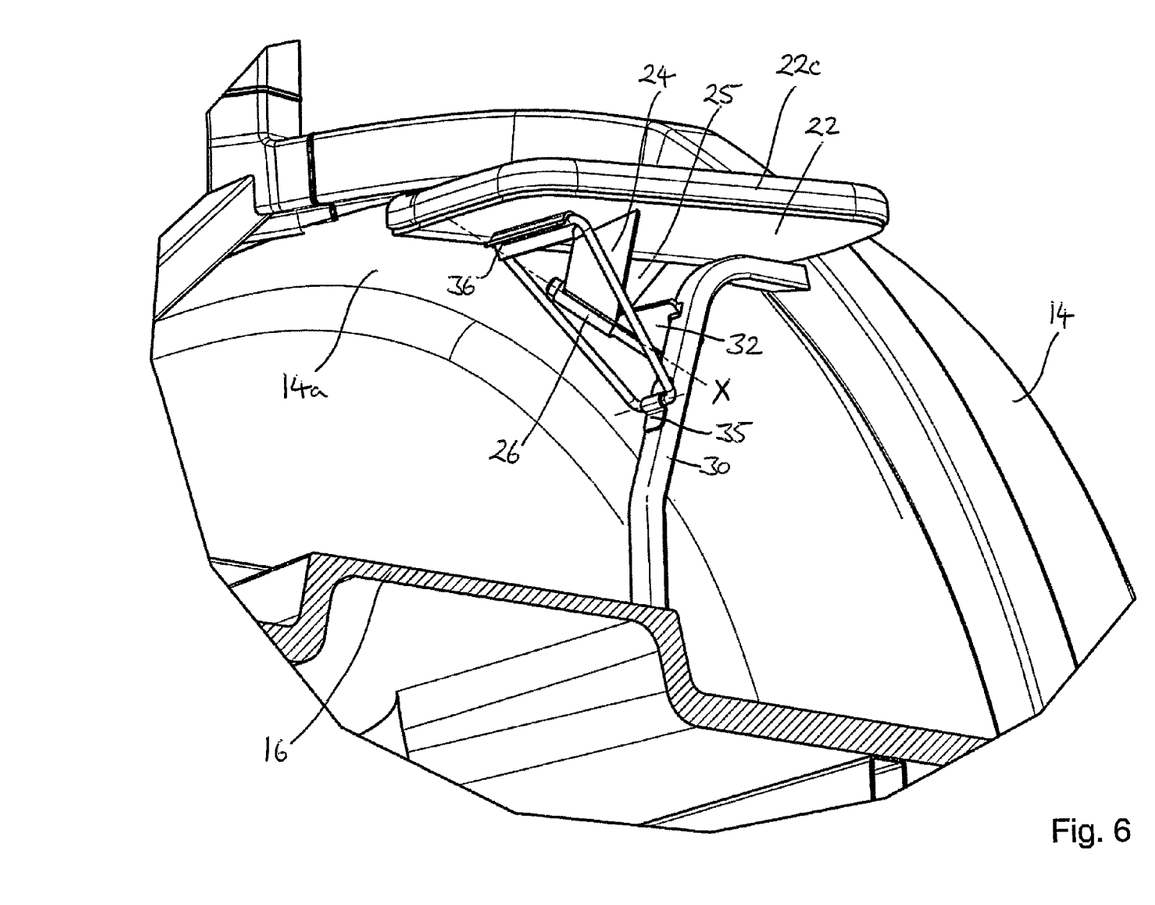
FIG. 6 is a perspective view of the section 6-6 shown in FIG. 3 shown with the driver's seat and steering wheel removed.
Figure 7:
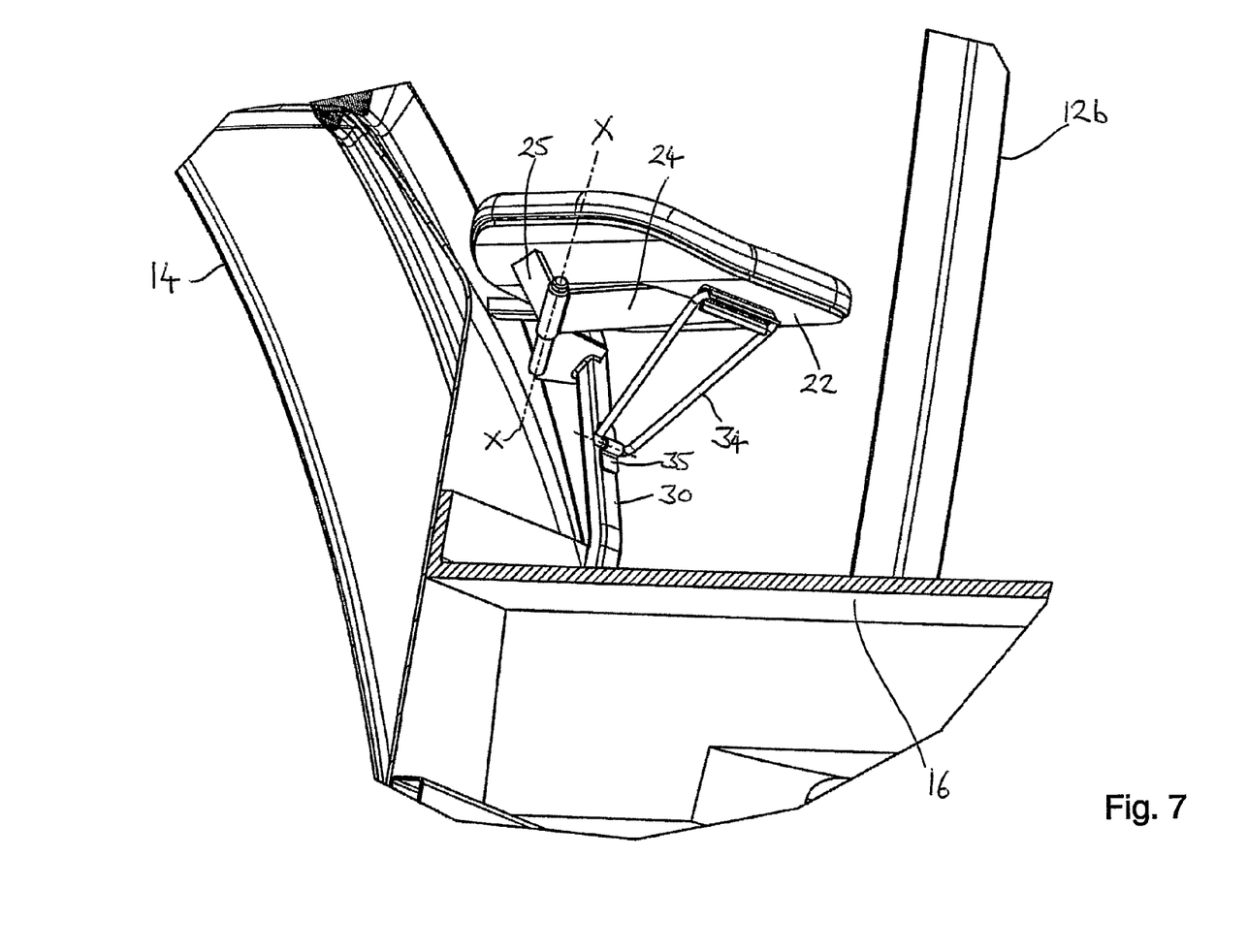
FIG. 7 is a perspective view of the section 7-7 shown in FIG. 3 shown with the driver's seat removed.

With particular reference to FIGS. 6, 7 and 8, to the underside of the rigid plate section 22b of seat tray 22 two struts 24, 25, formed of steel plate, are secured in a triangulated structure. Both struts 24, 25 are welded to a sleeve 26 so as to radially extend therefrom. Together with the underside of the seat tray base 22a, the struts 25, 26 form the rigid triangulated structure. The struts 24, 25 serve to support a large proportion of the weight exerted on the seat tray 22. The sleeve 26 fits on, and rotates around, a mounting shaft 28 which is secured to a frame member 30 by a bracket 32 welded thereto.

The frame member 30 may form part of the cab structure and has a profile which conforms with that of the inside edge 14a of fender 14. The frame member 30 shown in the drawings is formed of square section bent to the desired profile. However; other suitable materials are envisaged to provide the supporting structure. It should be appreciated that the frame member 30 may be secured independent of the cab structure but will be fixed in relation thereto.

Figure 5:
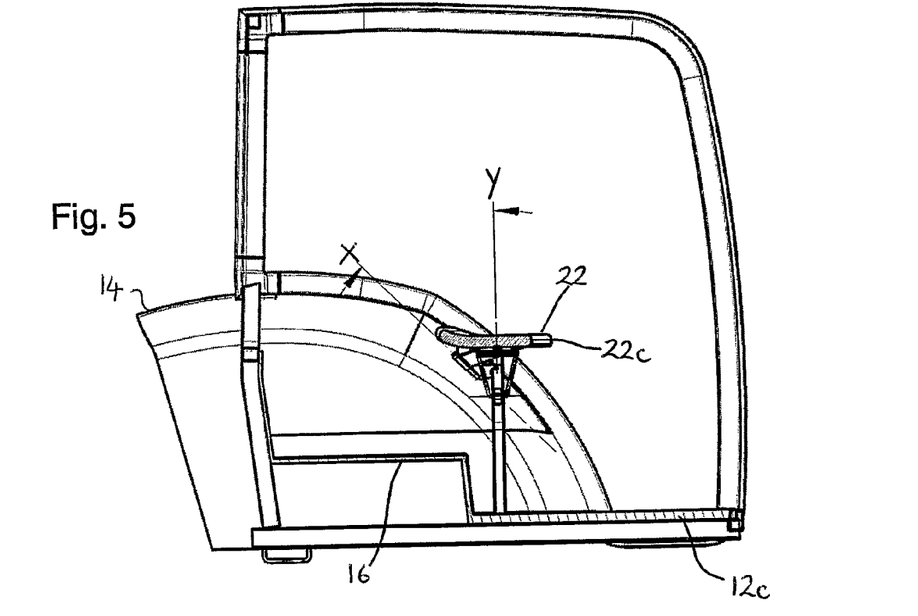
FIG. 5 is a view of the section 5-5 shown in FIG. 4 showing a side view of the passenger seat in the seating position.
Figure 10:
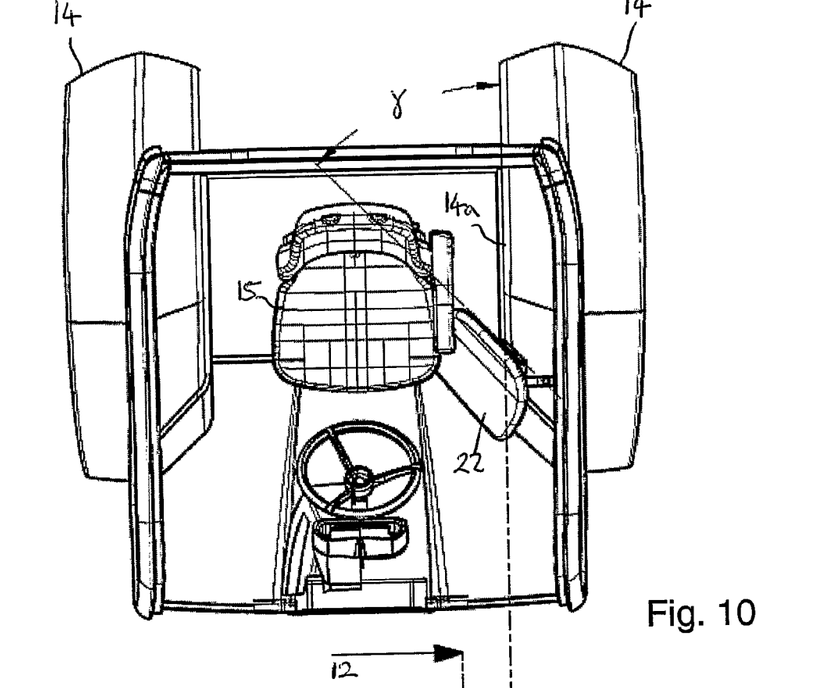
FIG. 10 is a plan view of the cab of FIG. 9.
Figure 11:
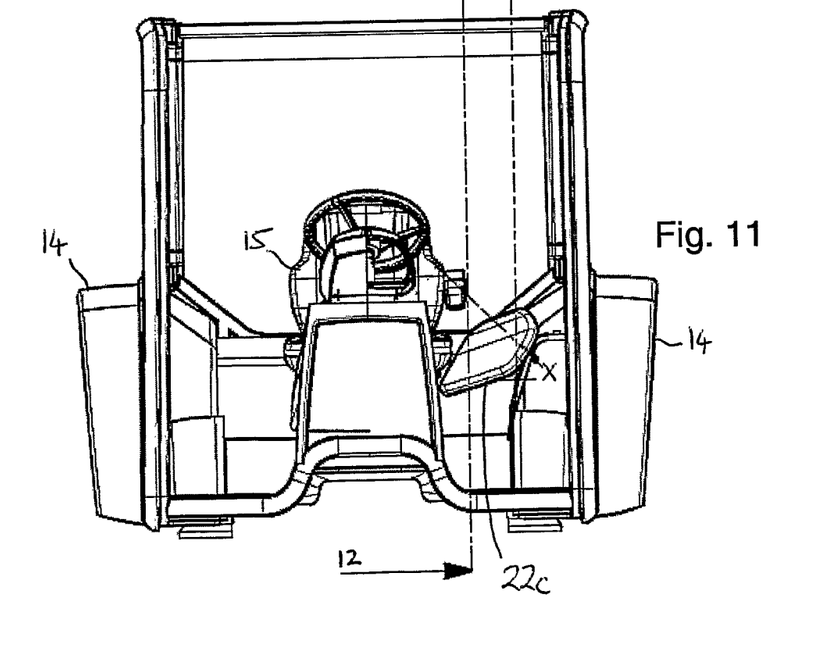
FIG. 11 is a front view of the cab of FIG. 9.
Figure 12:
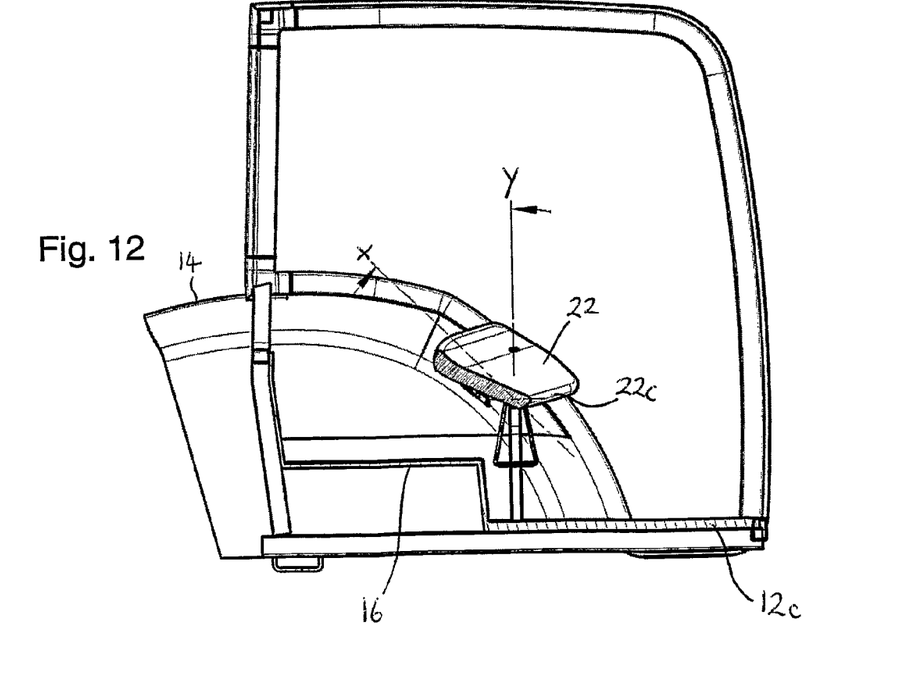
FIG. 12 is a view of the section 12-12 shown in FIG. 11 showing a side view of the passenger seat in the intermediate position.
Figure 13:
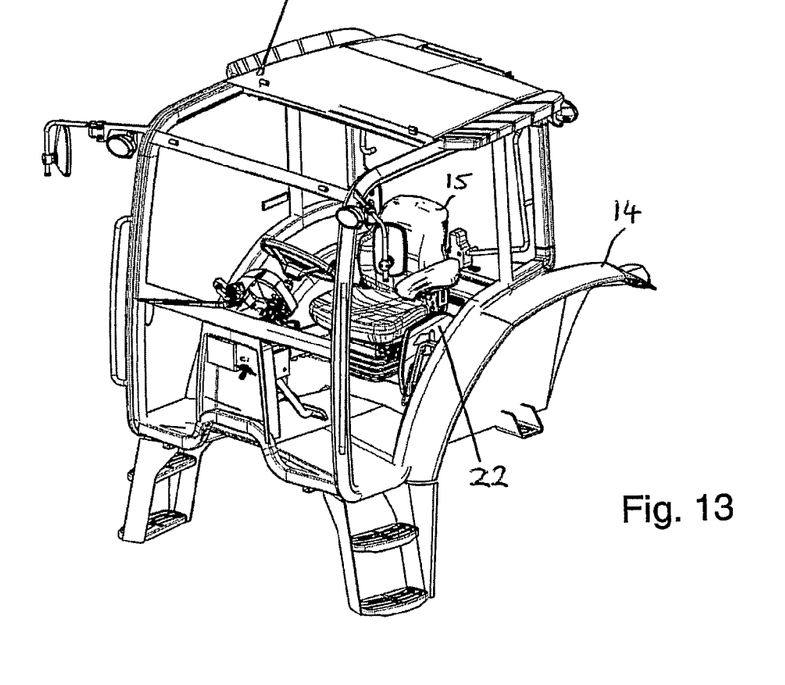
FIG. 13 is an isometric perspective view of the tractor cab of FIG. 2 shown with the passenger seat in a stowed position.
Figure 14:
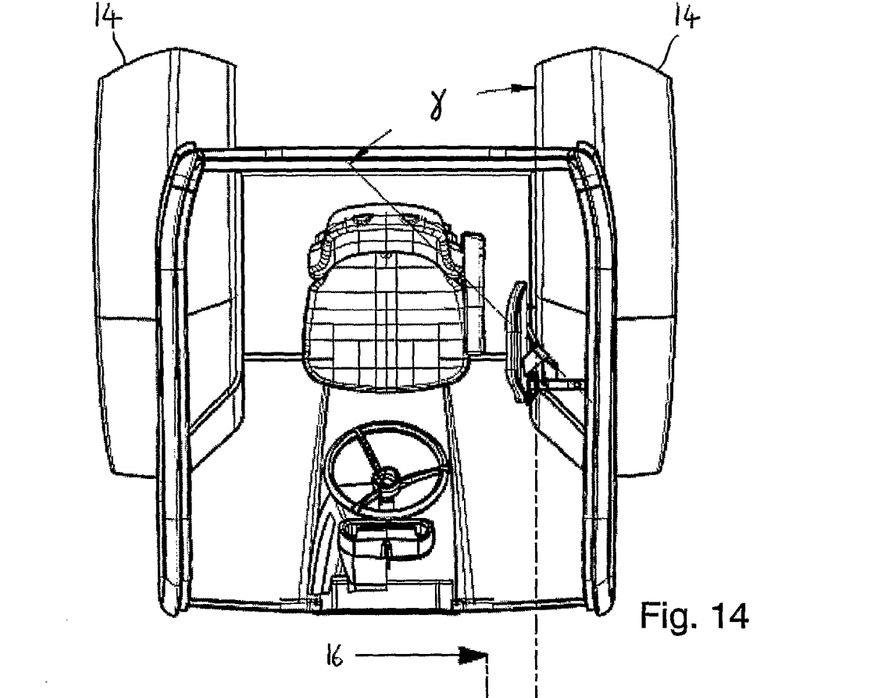
FIG. 14 is a plan view of the cab of FIG. 13.
Figure 15:
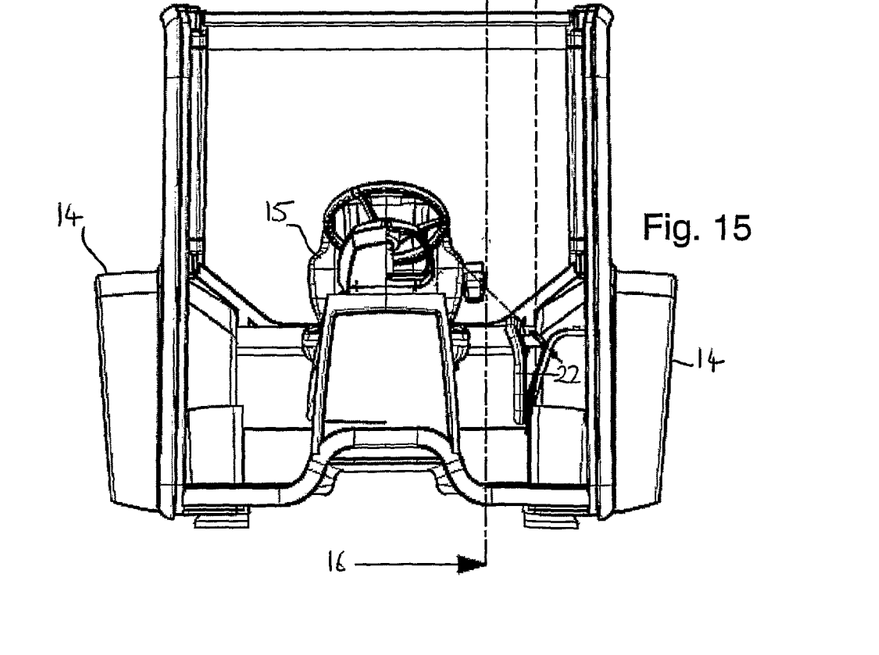
FIG. 15 is a front view of the cab of FIG. 13.

The orientation of mounting shaft 28 defines an axis X around which the seat tray 22 pivots between a substantially horizontal seating position (FIGS. 2 to 7) and a stowed position (FIGS. 13 to 16). Axis X is disposed at an angle $\alpha$ of 45 degrees to the horizontal (FIG. 16), at an angle $\beta$ of 45 degrees to a transverse vertical plane (represented by line Y in FIGS. 5 and 12), and at an angle $\gamma$ of 45 degrees to a longitudinal vertical plane (FIGS. 10 and 14).

Figure 16:
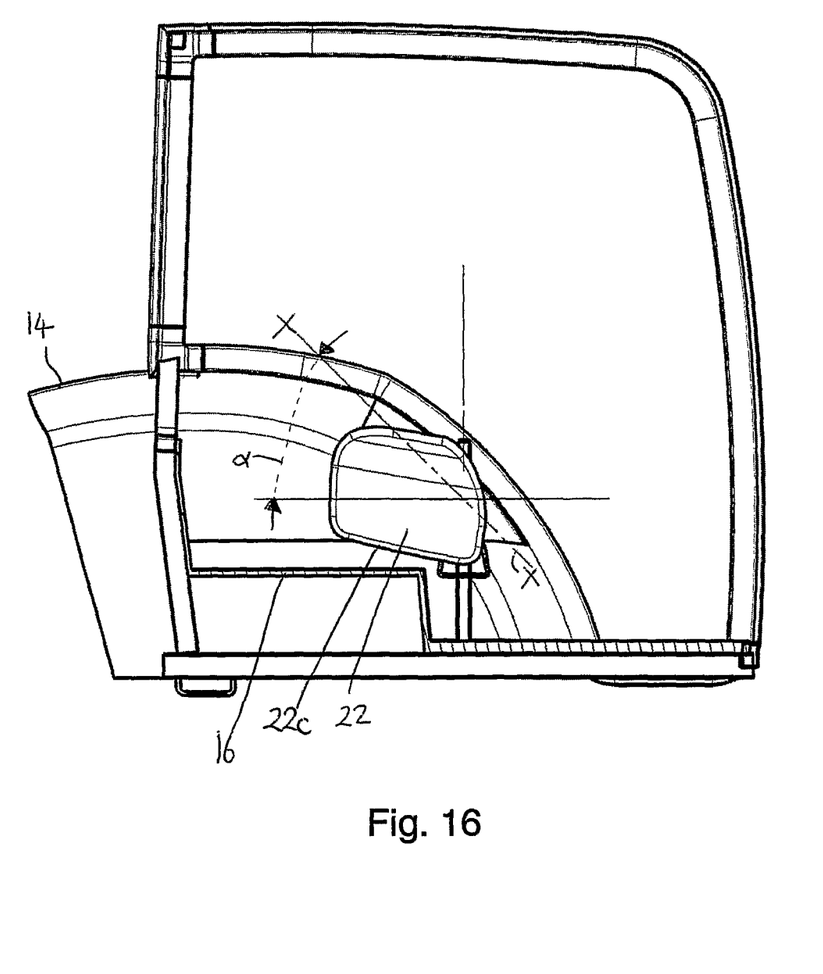
FIG. 16 is a view of the section 16-16 shown in FIG. 15 showing a side view of the passenger seat in the stowed position.

From the end of mounting shaft 28 that is secured to bracket 32 the shaft 28 extends rearwardly and upwardly and into the volume of the cab. Advantageously, in accordance with the invention the forward facing edge 22c of the seat tray 22 when in the seating position (FIGS. 5 and 6) becomes the lower most edge when in the stowed position (FIG. 16). Furthermore, the seat tray 22 can be folded between the two positions in one fluid pivoting movement.

To secure the seat tray 22 in the seating position a support element 34 is provided. The support element 34 is pivotally secured to the frame member 30 at a position approximately 20 cm from the top thereof. A securing element 35 surrounds a tubular part of the supporting element so as to allow the pivoting motion.

The supporting element 34 simply rests against the frame member 30 when not required. When the seat tray is lifted to the seated position the supporting element 34 is pivoted upwardly and is engaged with a catch 36 which is secured to the underside of the rigid steel part 22b of seat tray 22. Therefore, the supporting element 34 and the mounting shaft 28 provide triangulated support for the weight upon seat tray 22.

The seat tray is simply moved to a stowed position by releasing support element 34 from catch 36 and lowering the seat tray in one fluid move.

The dimensions, geometry and orientation of mounting shaft 28 and struts 24,25 can be chosen to locate the seat tray 22 in the desired position, both when in the seating position and in the stowed position. Advantageously, the mounting shaft 28 which is angled in three dimensions provides a pivoting axis X which allows the seat tray 22 to extend forwardly of the frame member 30 when in the seating position whilst also positioning the seat tray at least partly rearwardly of the frame member when in the stowed position. Therefore, when stowed, the seat tray is located between the driver's seat 15 and the inside edge 14a of fender 14 ensuring that it does not cause an obstruction to the driver.

From reading the present disclosure, other modification will be apparent to persons skilled in the art. Such modifications may involve other features which are already known in the field of foldaway seats and component parts therefore and which may be used instead of or in addition to features already described herein.

The invention claimed is:

1. A foldaway passenger seat fitted to a utility vehicle, the utility vehicle having a longitudinal centre line extending in a forward facing driving direction from a forward end of the utility vehicle to a rear end of the vehicle, the seat comprising a seat tray which is moveable between a substantially horizontal seating position and a substantially vertical stowed position, the seat tray having an upper surface upon which the passenger sits when the seat tray is in the seating position and a front edge which forms the front of the seat with respect to the longitudinal centre line of the utility vehicle when the seat tray is in the seating position, the front edge of the seat tray being forward facing toward a front end of the utility vehicle with respect to the longitudinal centre line of the utility vehicle when the seat tray is in the seating position, the seat tray being pivotable around a single axis between the seating position and the stowed position, wherein the single axis is positioned relative to the seat tray so that the front edge of the seat tray is a lower-most edge of the seat tray and aligned longitudinally with respect to the longitudinal centre line and opposite the forward facing driving direction of the utility vehicle when the seat tray is in the stowed position.

2. A seat according to claim 1, wherein the axis is within the range of 40 to 50 degrees to the horizontal and to a transverse vertical plane.

3. A seat according to claim 1, wherein the seat is for mounting to the inside edge of a fender and wherein the axis extends from one end nearest the fender rearwardly and upwardly.

4. A seat according to claim 1, wherein the axis is defined by a mounting shaft fixed relative to a cab of the utility vehicle.

5. A seat according to claim 4, wherein the seat tray is secured to a mounting element at one end, the mounting element being rotatably mounted to the mounting shaft.

6. A seat according to claim 5, wherein the mounting element comprises a sleeve which fits and rotates on the mounting shaft.

7. A seat according to claim 6, wherein the mounting element further comprises at least one strut secured between the sleeve and the underside of the seat tray, the strut extending substantially radially from the sleeve.

8. A seat according to claim 6, wherein the mounting element comprises two struts secured to an underside of the seat tray in a triangulated structure.

9. A seat according to claim 4, wherein the mounting shaft is secured to a frame member which forms part of a cab structure.

10. A seat according claim 1, further comprising a supporting element which is pivotally attached to the seat tray and engages with a catch when in the seating position to support part of a user's weight when seated.

11. A foldaway passenger seat fitted to a utility vehicle, the utility vehicle having a longitudinal centre line extending in a forward facing driving direction from a forward end of the utility vehicle to a rear end of the vehicle, the seat comprising a seat tray which can pivot around a single axis between a substantially horizontal seating position and a substantially vertical stowed position, wherein the axis is defined by a mounting shaft fixed relative to a cab of the utility vehicle, wherein a forward facing edge toward a front end of the utility vehicle of the seat tray in the seating position is a lower-most edge and aligned longitudinally with respect to the longitudinal centre line of the utility vehicle when in the stowed position, and wherein the seat tray is secured to a mounting element at one end, the mounting element being rotatably mounted to the mounting shaft, wherein the mounting element comprises a sleeve which fits and rotates on the mounting shaft and two struts secured to an underside of the seat tray in a triangulated structure.

12. A seat according to claim 11, wherein the mounting element further comprises at least one strut secured between the sleeve and the underside of the seat tray, the strut extending substantially radially from the sleeve.

13. A seat according to claim 11, wherein the axis is within the range of 40 to 50 degrees to the horizontal and to a transverse vertical plane.

14. A seat according to claim 11, wherein the seat is for mounting to the inside edge of a fender and wherein the axis extends from one end nearest the fender rearwardly and upwardly.

15. A seat according to claim 11, wherein the mounting shaft is secured to a frame member which forms part of a cab structure.

16. A seat according claim 11, further comprising a supporting element which is pivotally attached to the seat tray and engages with a catch when in the seating position to support part of a user's weight when seated.

* * * * *